US007798288B2

(12) United States Patent
Blasek

(10) Patent No.: US 7,798,288 B2
(45) Date of Patent: Sep. 21, 2010

(54) CLIMBING AID FOR LADDERS

(75) Inventor: Frank Blasek, Bergisch Gladbach (DE)

(73) Assignee: Greifzug Hebezeugbau GmbH, Bergisch Gladbach (DE)

( * ) Notice: Subject to any disclaimer, the term of this patent is extended or adjusted under 35 U.S.C. 154(b) by 980 days.

(21) Appl. No.: 10/592,580

(22) PCT Filed: Feb. 18, 2005

(86) PCT No.: PCT/EP2005/001699

§ 371 (c)(1),
(2), (4) Date: Sep. 13, 2006

(87) PCT Pub. No.: WO2005/095750

PCT Pub. Date: Oct. 13, 2005

(65) Prior Publication Data

US 2008/0142298 A1 Jun. 19, 2008

(30) Foreign Application Priority Data

Mar. 15, 2004 (DE) .................. 20 2004 004 117 U

(51) Int. Cl.
*B65G 15/00* (2006.01)

(52) U.S. Cl. .......................... 182/42; 182/19; 192/150; 477/8

(58) Field of Classification Search ................ 192/56.6, 192/150, 55.1, 48.3, 30 W, 70.12, 113.34; 477/7, 177, 8, 181, 178; 318/1, 2, 6, 41, 318/436; 182/42, 43, 44, 19; 464/45
See application file for complete search history.

(56) References Cited

U.S. PATENT DOCUMENTS 3,651,708 A 3/1972 Müller
3,908,801 A 9/1975 Pohlman
4,538,703 A 9/1985 Ellis et al.
4,550,804 A 11/1985 Bummer (Continued)

FOREIGN PATENT DOCUMENTS

DE 202 16 895 1/2003

(Continued)

OTHER PUBLICATIONS

Written Opinion of the International Searching Authority Report for International Application No. PCT/EP2005/001699.
International Preliminary Report on Patentability for International Application No. PCT/EP2005/001699.
International Search Report corresponding to International Application No. PCT/EP2005/001699.

*Primary Examiner*—Katherine W Mitchell
*Assistant Examiner*—Daniel Cahn
(74) *Attorney, Agent, or Firm*—Rankin, Hill & Clark LLP

(57) ABSTRACT

The invention relates to a climbing aid for ladders or the like, comprising an endless traction means running between guide pulleys, from which a person may optionally hang by means of a suspension device, with a drive device (20) comprising a drive motor (21), by means of which one of the guide pulleys may be driven as the drive disc (12) for the drive means (13), with a traction force limitation device and with a device for switching the drive device on/off, which can be actuated by the endless traction means (13). According to the invention, the traction force limitation device consists of a slip clutch (30) with torque limitation interposed between the drive disc (12) and the drive motor (21), and the device for switching the drive device on/off comprises sensor means (70) with which a movement of the traction means (13) can be detected, whereby the sensor means (70) are formed in such a manner that a detection of a sensor pulse switches the drive motor (21) on and an absence of sensor pulses within a time span switches the drive motor (21) off.

18 Claims, 3 Drawing Sheets

U.S. PATENT DOCUMENTS

Figure 1:
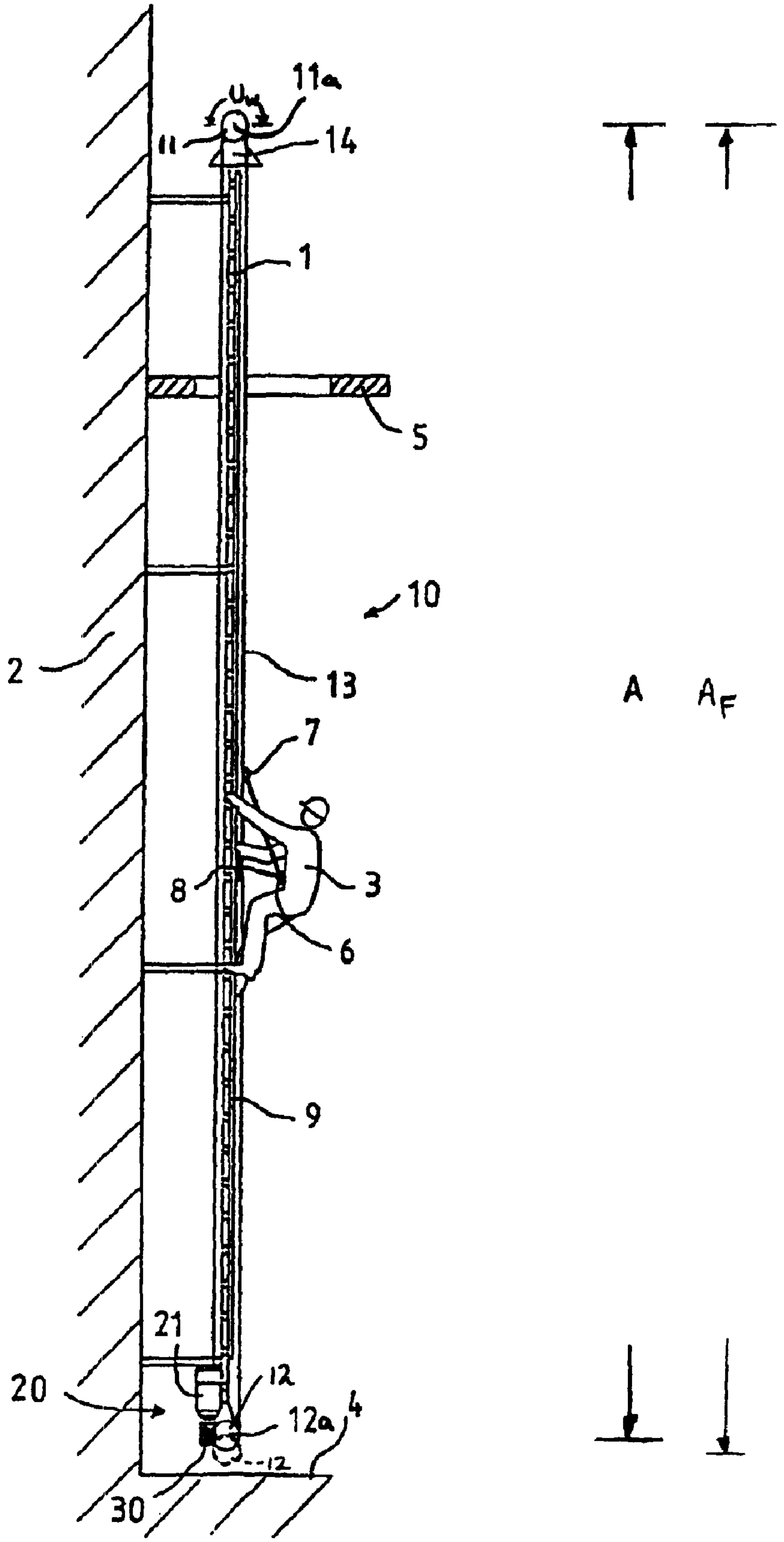

| | | | | |
|---|---|---|---|---|
| 4,833,555 | A * | 5/1989 | Humphreys | 360/99.12 |
| 5,471,940 | A * | 12/1995 | Wakana | 112/220 |
| 5,609,429 | A * | 3/1997 | Fogle et al. | 400/692 |
| 5,724,786 | A * | 3/1998 | Singh et al. | 53/52 |
| 6,268,669 | B1 * | 7/2001 | Wakao et al. | 310/67 R |
| 6,358,171 | B1 * | 3/2002 | Whitfield | 474/266 |
| 7,156,217 | B2 * | 1/2007 | Raber | 192/84.6 |
| 2002/0014551 | A1 * | 2/2002 | Tuttlebee | 242/390.8 |
| 2002/0050446 | A1 * | 5/2002 | Antoniazzi | 198/847 |
| 2004/0020719 | A1 | 2/2004 | Kwak | |

FOREIGN PATENT DOCUMENTS

| | | | |
|---|---|---|---|
| DE | 20216895 | U1 * | 1/2003 |
| DE | 101 61 573 | | 7/2003 |
| EP | 1 277 495 | | 1/2003 |
| FR | 2 440 906 | | 6/1980 |
| GB | 2 167 913 | | 9/1985 |
| WO | WO 03/002447 | | 1/2003 |
| WO | WO 03/071083 | | 8/2003 |

* cited by examiner

CLIMBING AID FOR LADDERS

The invention relates to a climbing aid for ladders, vertical ladders, vertical iron gangway or the like, with an endless traction means running between an upper guide pulley and a lower guide pulley, from which traction means a person may optionally hang by means of a suspension device, with a drive device comprising a drive motor, by means of which one of the guide pulleys may be driven as drive disc for the traction means, with a drive force limitation device and a device for switching on/off the drive motor which can be actuated by means of the endless traction means.

Ladders or vertical iron gangways having a large height are mounted in particular to wind energy plants and chimneys, which have to be climbed and descended on a regular basis by the service personnel. The personnel often wears a combined catch and holding belt with several catch and holding lugs so as to connect the belt with guide ropes, catch ropes, linkage winches and the like for preventing a fall. As the climbing of long ladders or vertical iron gangways is time and energy-consuming for the person, it is known from the state of the art to use climbing aids which relieve the personnel during the overcoming of the height differences.

A typical climbing aid is hereby known from FR 2440906 A1. With the typical climbing aid, the personnel can grip a bracket which is mounted on the traction means. The switching on and off of the drive motor of the climbing aid takes place by pulling at one of the two strands of the of the traction means. So as to effect the switching on or off, the drive motor is arranged in a pivotal manner to a certain degree in a housing frame, so that, by the first-time pulling at one of the strands, the motor pivots in the corresponding direction, and the energy supply is switched on hereby by switches which are actuated by the pivoting of the motor. The energy supply is maintained while a force is applied via the bracket and the corresponding traction means which force is opposite to its movement.

As numerous wind parks with respectively several wind energy plants have been created recently, which have to be serviced on a regular basis, different concepts have been suggested to provide the ladders of in particular these wind energy plants with a climbing aid. Modern climbing aids consider hereby that it is stipulated in safety instructions that, with ladders from a certain height, a fall safety device has to be provided for the personnel. From EP 1277495 A1 is for example known a climbing aid with a winding winch where the personnel can connect the belt harness to the free end of the traction means so as to achieve a relief by the winding winch during the climbing of the ladder. The winding winch is thereby formed as a constant traction winch with which a traction force is applied to the traction means, which gives the personnel a relief when climbing the ladder, but which is not sufficient to pull the personnel upwards without their own assistance. In EP 1277495 A1 the switching on/off of the drive motor takes place by means of a switching rope which is tensioned separately from the traction means and parallel thereto and which has to be installed parallel to the vertical ladder so that it can be operated from each location of the vertical ladder. This requires an additional installation effort for the climbing aid. The use of a winding winch has furthermore the disadvantage that it is necessary to guide the traction means back to the starting point before another person can climb or descend the vertical ladder.

This disadvantage can be avoided in that the climbing aid operates with a circulating endless traction means. Corresponding climbing aids are known from DE 101 61 573 A1 and WO 03/071083 A1. By the use of an endless traction means a person can suspend him/herself anew from the traction means at any time. With the previously known climbing aids, the switching on and off of the drive motor takes place again by means of a switch-off rope placed separately over the entire height of the ladder.

A further climbing aid with an endless traction means is known from DE 202 16 895 U1 by this applicant. So as to limit the traction force applied to the person suspended from the traction means, one of the guide pulleys is formed as drive disc and a slip clutch with torque limitation is interposed between the drive disc and the drive motor. During the climbing of the ladder, the personnel using the climbing aids experiences a relief up to the maximum transferable torque adjusted by means of the slip clutch. If the person remains standing, the slip clutch slips through. The switching on or off of this climbing aid is not discussed in DE 202 16 895 U1. But it was considered to conduct the switching on and off also by means of a rope switch which is placed parallel to the vertical ladder.

It is the object of the invention to create a climbing aid for vertical ladders in particular for wind energy plants which can be installed at the vertical ladders with little effort and which enable a reliable switching on and off of the drive motor from each location of the vertical ladder.

This object is, starting with the typical climbing aid, solved in that the traction force limitation device consists of a slip clutch with torque limitation interposed between the drive disc and the drive motor and that the device for switching on/off comprises sensor means with which a movement of the traction means can be detected, whereby the sensor means is formed or provided in such a manner that a detection of a sensor pulse of the sensor means switches the drive motor on and an absence of sensor pulses within a time span switches the drive motor off. Contrary to the typical climbing aid, a slip clutch with torque limitation is used as the traction force limitation according to the invention. The use of a slip clutch between the drive motor and the drive disc creates the requisite that in cases where the person does not want to climb any further, the traction means can be used as a trigger for the switching on or off of the drive motor. The switching on or off takes place in particular by connecting through or interrupting the current supply to the drive motor. With the slip clutch arranged according to the invention, sensor means can therefore be used which detect the movement of the traction means directly or indirectly and which switch the drive motor in dependence of the detected sensor pulses on or off, whereby the traction means is used for the actuation of the switching on/off. The climbing aid according to the invention does thereby not operate with a displacement of the drive motor or the drive device as in the typical state of the art according to FR 2440906 A1.

The arrangement and formation of the sensor means can take place in different ways. In a possible embodiment, the traction means itself could form the pulse generator, whereby a pulse generator can preferably be integrated in the traction means with regular distances for this, whereby the presence of sensor pulses within certain time spans is checked by means of a stationary pulse detector. The switching on or off of the sensor means takes place by a pulling of the traction means according to the invention, by for example, the person beginning to climb the vertical ladder, or by holding the traction means by the person remaining standing. The last-mentioned results in that the slip clutch slips through and that sensor pulses are absent due to the temporary standstill of the traction means.

As the immediate detection at the traction means would require a comparatively elaborate manufacture of the traction means, the detection of the sensor pulses does not take place directly at the traction means but only indirectly in the preferred embodiment. For this, in an embodiment, a roll abutting the traction means and rotating with the movement of the traction means can form the pulse transmitter. But it is particularly advantageous if the drive disc forms the pulse transmitter as an already necessary present component. As the traction means is driven by means of the drive disc, a slip-free connection exists between the drive disc and the traction means. Every movement of the traction means thus results directly in a movement of the drive disc and vice versa. It is particularly advantageous if the sensor means comprise a pulse generator means assigned to the drive disc or the roll. The pulse detector can cooperate with the pulse generator contactless or by contact. The pulse generator can particularly consist of a cam, a groove, a bore, a magnet or a mirror or the like at the drive disc or the roll. The pulse detector can then, correspondingly adapted to the pulse generation element, consist of a key switch, a micro switch, a sliding contact switch, a magnetic field switch, an (ultra)sound detector, a photo sensor switch or the like. Internal experiments by the applicant have surprisingly shown that the combination of a cam at the drive disc and a stationary key switch which is actuated with every rotation of the drive disc operate reliably even with continuous operation and enable a highly reliable detection of the sensor pulse and thereby enable a safe switching on or off of the motor. Conveniently, an entire rotation of the drive disc or roll actuates a pulse correspondingly. While the drive motor is switched off, this first pulse results in that the drive motor is switched on. While the motor is switched on, it remains switched on as long as a sensor pulse is detected which is actuated by the rotation of the drive disc within a certain time span. Only when the pulse is absent within a predetermined time span, the drive motor is switched off automatically, by for example interrupting the energy supply to the drive motor by a suitable circuit.

So as to enable the switching on or off of the drive motor by pulling or holding the traction means with preferably low effort, the slip clutch of the climbing aid according to the invention comprises a clutch disc in the preferred embodiment, which is mounted on a drive shaft driven by the drive motor with interposition of a free-wheel for a direction of rotation. The free-wheel is hereby preferably arranged in the direction of rotation in which the traction means is driven during operation. If a person therefore wants to switch on the drive motor of the climbing aid, he pulls at the traction means in the climbing direction due to the free-wheel and the switched-off drive motor nearly without opposite force, until the pulse generator actuates a sensor pulse for example at the drive disc at the pulse detector, which then switches the drive motor on. Furthermore preferably, the drive disc then forms the opposite clutch disc, which is mounted correspondingly on the drive shaft in a rotatable manner. It is of particular advantage if a sealed chamber is formed between the clutch disc and the opposite clutch disc, which chamber is preferably filled with a suitable liquid such as an oil through a filling bore in the drive disc forming the opposite clutch disc. The particularly preferred embodiment therefore uses a wet one- or two-disc clutch as slip clutch, in particular a wet multiple disc clutch such as an oil bath slip clutch, so as to improve the heat removal and to minimise the wear on the friction pads.

So as to achieve a compact construction of the climbing aid, the drive motor, gear, and slip clutch preferably form a mounting unit which is mounted in a housing in a stationary and non-tiltable manner. With this preferred embodiment, the traction means can circulate under tension between the two guide pulleys. The starting length of the un-tensioned traction means is shorter than the sum of the twofold distance between the axes of rotation of the guide pulleys, the effective deflection circumference at the upper guide pulley and the effective deflection circumference at the lower guide pulley in the mounting state of the climbing aid. The tension of the traction means is preferably only adjusted by changing the distance between the upper and the lower guide pulley. With the tension of the traction means, its starting length is preferably extended by about 05.-5% of the circulation length. In a preferred embodiment, the lower guide pulley together with the mounting unit is attached to the ladder or a brickwork in a detachable manner for the pretension of the traction means, to which brickwork the ladder is mounted, so that, during the tension of the traction means, the weight of the drive can be used for changing the length of the traction means.

Alternatively or additionally, at least one pressure roll or a pressure element can be assigned to the drive disc, which element presses the traction means against the drive disc. With a climbing aid formed in such a matter, the endless traction means can also circulate between the guide pulley and the drive disc in particular without inner tensions in an un-tensioned manner, whereby the pressure force necessary for the drive ability of the drive disc is applied over the pressure roll or the pressure element. In this embodiment, the pressure roll or the pressure element can also form the pulse transmitter. It is particularly advantageous if the traction means is pressed into a guide groove of the drive disc by a single pressure roll. So as to be able to apply the pressure and to be able to adapt the climbing aid to different diameters of the traction means, the minimum distance between the pressure roll and the drive disc for applying the necessary clamping or pressure forces is adjustable. The pressure roll can furthermore preferably consist of polyamide and/or the circumferential surface of the pressure roll comprises a concentric pressure bar, the width of which is smaller than the opening width of the guide groove of the drive disc, so that the pressure bar can plunge into the guide groove and prevent a lateral exit of the traction means from the guide groove.

The traction means conveniently consists of a reversibly expandable and/or reversibly compressible plastics material, in particular a fibre-reinforced plastics material. The fibre reinforcement can in particular take place through a suitable central fibre, where the central fibre can be provided with suitable pulse generators, with digital colour changes arranged with a distance from one another, for example, when the detection of the movement pulses is to take place directly over the traction means. The traction means is in particular a circular belt. A polyester can be used as the preferred plastics material, so that the traction means can be connected to a closed circulating traction means by welding two ends together.

Due to safety reasons, a bar or the like can be formed in the centre of the ladder with which a catching device cooperates independently from the traction means. The suspension device is preferably coupled to a belt system which is placed around the body of the person climbing the ladder. The suspension device can in particular comprise a climbing clamp which can be fastened to the traction means in a detachable manner.

Figure 2:
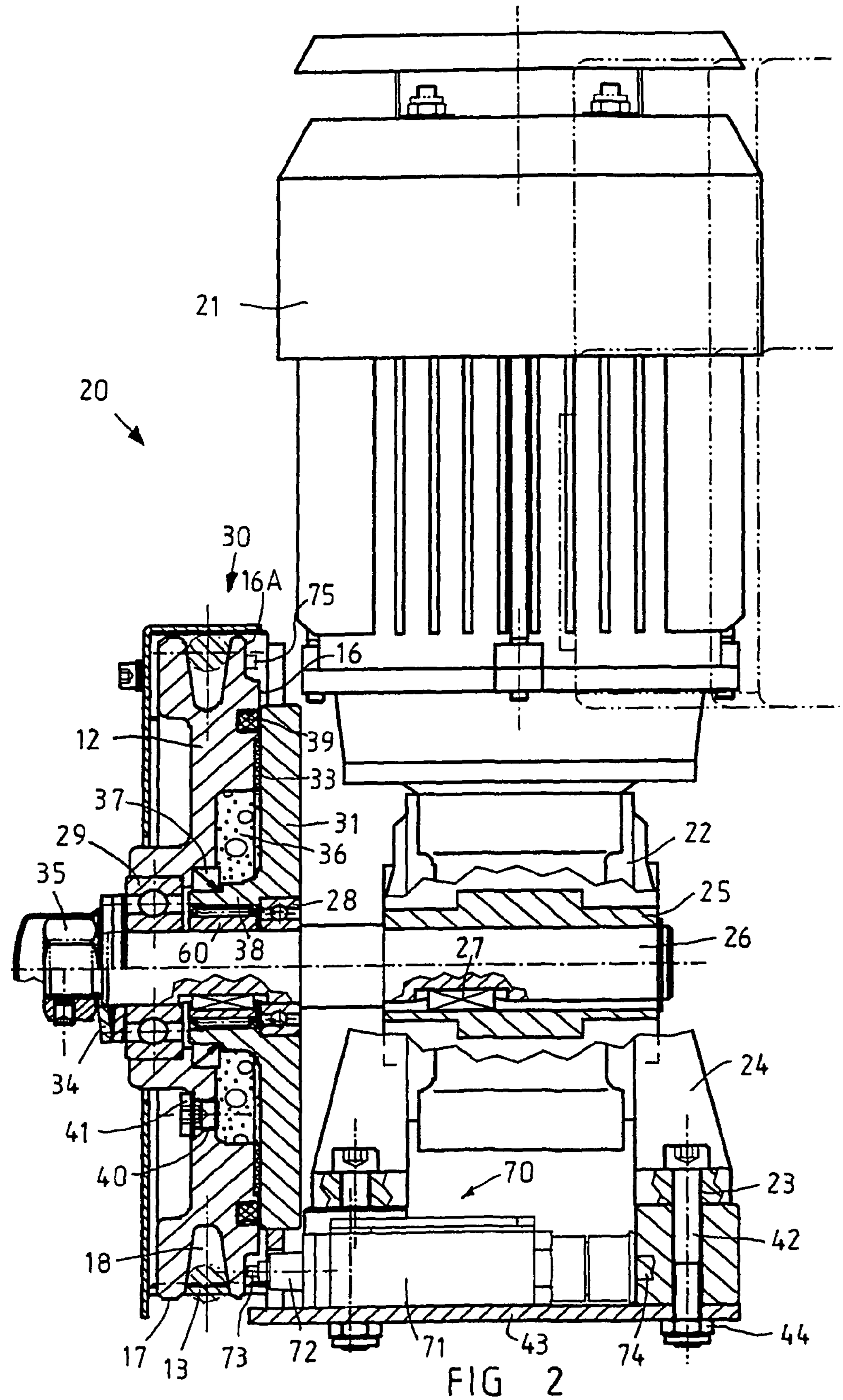
Figure 3:
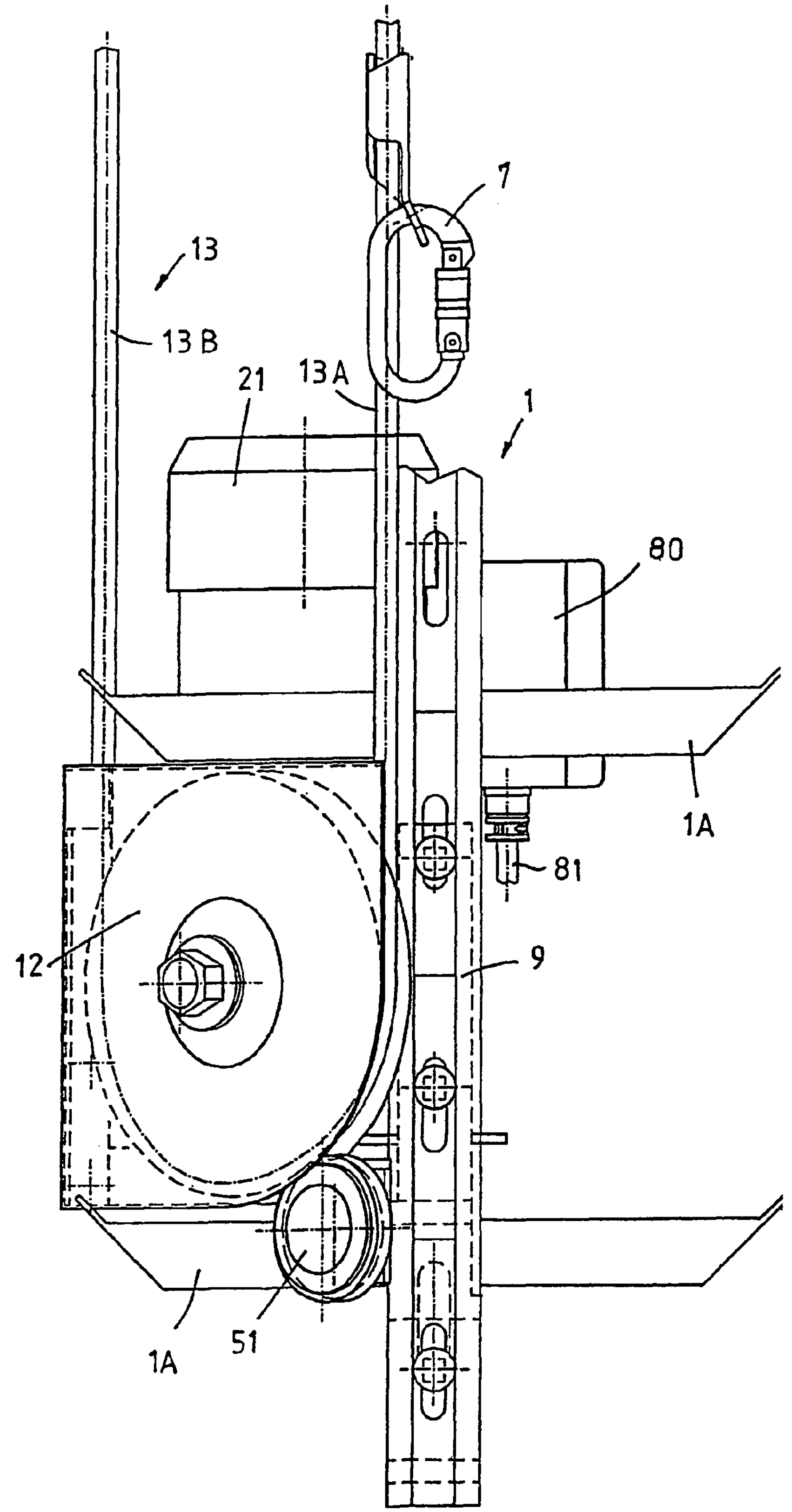

Further advantages and embodiments of the invention result from the following description of examples of embodiments shown schematically in the drawings. It is shown in the drawings:

FIG. 1 a ladder with the climbing aid according to the invention in operation schematically in a side view;

FIG. 2 the drive device and sensor means of the climbing aid according to the invention according to a first embodiment, partially in section; and FIG. 3 a second embodiment of a climbing aid schematically with a drive disc and pressure roll in a side view.

In the principal view according to FIG. 1, a vertical iron ladder 1 is mounted to a wall 2, and a person 3 can climb from the ground 4 to a platform 5 by means of the vertical ladder 1. A climbing aid designated as 10 as a whole is arranged at the ladder 1, comprising an upper guide pulley 11, a lower guide pulley 12, and a circular belt 13 circulating between the guide pulleys 11, 12. In the preferred embodiment according to FIGS. 1 and 2, the circular belt runs between the two guide pulleys 11, 12 under tension, as is described in DE 20216895 U. The upper guide pulley 11 is mounted at the upper end of the vertical iron ladder 1 in a rotatable manner by means of a suitable limit plate 14. The lower guide pulley 12 forms a drive disc for the circular belt 13 and is driven by a mounting unit or drive device 20, comprising a drive motor 21 and a slip clutch designated as 30 as a whole, as will be explained further. The person 3 wears a belt system, not shown further, with at least a holding lug 6 in the stomach region which is connected to a suspension device 7 which can comprise in particular a climbing clamp, not shown, and which can optionally be connected or disengaged to the endlessly rotating circular belt 13 by clamping. Corresponding suspension devices and climbing clamps are for example known from climbing sports or as a safety device for catching and holding systems. Furthermore, a catching device 8 which is guided in a rail in a sliding manner which is situated in the centre plane of the vertical ladder 1 is connected to the holding lug 6 at the belt system of the person 3

The mounting unit 20 of a drive motor 21 and a slip clutch 30 for limiting the traction force which can be achieved with the circular belt is attached at the lower end of the ladder 1 in a detachable manner, and the mounting unit 20 can preferably be lowered (depicted schematically by the lower pulley 12 shown in phantom) by means of a suitable tensioning device (not shown), so as to increase the starting distance A between the pivot centre 11*a*, 11*b* of the two single guide pulleys 11, 12 to the final distance $A_F$, and to tension the circular belt 13, after it had been positioned around both guide pulleys 11, 12 to tension. The circular belt 13 consists of a polyester with a central traction fibre, and the ends of the circular belt can be welded to one another at a welding temperature of about 260°. The circular belt is for example a belt with a shore hardness of about 100 A or 55 D. The circular belt 13 is tensioned around about 1-2% of its entire length by lowering the mounting unit 20; for introducing the pretension into the circular belt 13. The starting length of the circular belt 13 is therefore shorter than the sum of double the distance A between the centre axes 11*a*, 11*b* of the guide pulleys 11, 12 as well as their effective deflection circumference $U_w$ (only shown with respect to the upper guide pulley 11 for clarity) of respectively $$U_w=\Pi * R_{guide\ pulley}.$$

The pretension avoids a slipping through of the circular belt 13 at the lower guide pulley forming the drive disc 12 driven by the mounting unit 20. The maximum tension force introduced into the circular belt 13 is hereby limited to a value of for example 400N by means of the slip clutch 30 as tension force limiting device, so that the person 3, who has suspended himself in the climbing aid 10, will be relieved by a maximum weight of about 40 kg. If the force acting on the circular belt 13 against its running direction exceeds the maximum torque that can be transferred, the slip clutch slides through, so that only the maximum torque that can be transferred is available for the person 3 climbing the ladder.

The construction of the drive mounting unit 20 with the drive motor 21 and slip clutch 30 as well as the sensor means designated as 70 as a whole for switching on/off the drive motor 21 of the climbing aid by means of the traction element 13 is now explained with reference to FIG. 2. The electrical drive motor 21, shown only partially, is mounted to a console 24 in a non-tiltable manner, the fastening base of which is provided with bores 23 which are penetrated by screws 42. The console 24 is fastened to a limit plate 43 by means of screws 42 as well as nuts 44, which can again be fastened to the ladder 1 (FIG. 1). Of the gear, only the gear housing 22 and the pivotally mounted drive wheel 25 driven in a rotary manner by means of the electric drive motor 21 are shown, to which the drive shaft 26 is connected in a torque-proof manner by means of the fitting key 27. At the free end of the drive shaft 26 supported on one side by the drive wheel 25 in the housing 22, a clutch disc 31 of the slip clutch 30 is mounted, with interposition of a free-wheel in the centre of the axial mounting band 38 of the clutch disc 31 and a bearing 28. The free-wheel consists here of a free-wheel bush 60 which is connected in a stationary manner to the drive shaft 26 by means of the fitting key 32 and provides a free-wheel of the clutch disc 31 relative to the drive shaft 26, when the clutch disc 31 is rotated in its direction of rotation with stationary drive shaft 26. The free-wheel bush 60 effects a necessary entrainment of the clutch disc 31 when the drive shaft 26 rotates in the direction of rotation necessary for weight relief during the climbing of the ladder. The opposite clutch disc of the slip clutch 30 is formed by the lower guide pulley of the climbing aid which at the same time functions as the drive disc 12, according to FIG. 1, whereby the drive disc 12 is mounted on the drive shaft 26 in a rotatable manner by the bearing 29 mounted in its centre. In the disc surface 16 on the motor side of the corresponding strongly dimensioned drive disc or guide pulley 12 is fastened a suitable friction pad 33, for example a suitable blade, by means of which the guide pulley 12 is moved with the revolution speed of the drive shaft 26, as long as the force acting in the traction branch of the circular belt 13 against the direction of rotation of the drive shaft 26 does not exceed the slip torque of the slip clutch 30. The guide pulley 12 is pressed to the clutch disc 31 with a certain force by means of the plate springs 34 and the adjusting nut 35 for adjusting the slip torque, and the position of the adjusting screw 35 is fixed. If, during operation, the weight introduced by the person 3 (FIG. 1) exceeds the slip torque of the slip clutch 30, a slip develops between the clutch discs 12, 31. The guide pulley or drive disc 12 then rotates slower than the drive shaft 26 and the torque introduced therein by the drive motor 21 is only transferred up to the maximum transferable torque as is essentially known to an expert for slip clutches.

The slip clutch 30 is shown as a wet-type clutch in the embodiment shown, and a chamber 36 is formed between the clutch disc 31 and the guide pulley 12, which chamber, which is sealed by means of a radial shaft sealing ring 37, which is arranged between the axial mounting band 38 of the clutch disc 31 and the inner bore of the guide pulley 12, as well as a sealing ring 39 surrounding the friction pad 33 concentrically. The chamber 36 is filled with a suitable liquid such as oil by means of the filling bore 40 in the guide pulley 12, and the filling bore 40 is closed with the closing screw 41 on the operating side. So as to avoid a slipping through of the circular belt 13 in the driven guide pulley 12, it is provided with a V-shaped guide groove 18 at its circumference 17, the groove walls of which have a spread angle of about 22°. As the circular belt is placed around both guide pulleys 12 and 11 (FIG. 1) with tension, a slip-through of the circular belt 13 within the rope groove 18 cannot occur.

The switching on and off of the drive motor 21 of the climbing aid takes place in dependence of sensor pulses which are generated by sensor means 70 monitoring the rotation of the drive disc. The sensor means 70 comprise a stationary detector switch or pulse detector 71, which is mounted to the limit plate 43. The pulse detector 71 comprises a detection head 72 with a switch follower 73 which lies directly opposite a ring-shaped retraction 16A at the disc surface 16 of the drive disc 12 a the motorside. A cam 75 is formed in the retraction which passes the detection head 72 of the pulse detector 71 with every rotation of the drive disc 12, actuates the switch follower 73 and thus produces a sensor pulse in the pulse detector 71. If the drive motor 21 is switched off, that is, its current supply is interrupted by for example a suitable circuit (not shown) integrated in the pulse detector 71, the first switch pulse of the pulse detector 71 results in that the switch state of the circuit changes and that the drive motor is provided with electrical energy by the cable 74. A timer is hereby integrated into the pulse detector or the circuit which monitors if a sensor pulse is activated by the cooperation of the cam 75 and the switch follower 73 within a certain time span. If a sensor pulse occurs within a time span of for example 2 to 3 seconds, the drive motor 21 remains switched on. If no sensor pulse takes place, the current supply is interrupted and the drive motor 21 stops. The first actuation of a sensor pulse can hereby be effected in that the person holds the circular belt 13 after he has suspended himself from the circular belt 13 and climbs up the first two ladder rungs. Due to the free-wheel achieved with the free-wheel bush 60 in this rotational direction, the drive disc 12 as well as the clutch disc 31 rotate with the movement of the circular belt 13 virtually free of force. The rotation of the drive disc 12 leads again at least after a full rotation to a sensor pulse, whereby the drive motor 21 switches on and the climbing aid is put into operation. The person only has to remain standing for switching the drive motor off. By this, the drive belt 13 and the drive disc 12 cooperating with this in a non-slip manner are stopped, while the slip clutch 30 slips through entirely under full load, as the drive motor 21, the drive shaft 26 and the clutch disc 31 rotate further until the end of the time span. As a sensor pulse is then absent due to the standing drive disc 12, the drive motor 21 is switched off according to the invention.

The use or a circular belt running between the two guide discs under tension only depicts the preferred embodiment. With the embodiment shown in FIG. 3, the traction means 13 runs essentially tension-free between the guide pulleys. The non-slip entrainment between drive disc 12 and traction means 13 is achieved here by means of a pressure roll 51 or alternatively by means of a pressure element, as is described in detail for the pressure roll in DE 102 56 630. From FIG. 3 can be seen easily that the drive disc 12 and the pressure roll 51 lie in one plane which is aligned in an inclined manner relative to the rungs 1A of the vertical ladder 1. The drive branch 13A of the circular belt taking along the suspension device runs correspondingly in front of the vertical ladder provided with the bar 9 for the catching device and the back branch 13B behind the vertical ladder 1. The pressure roll 51 is positioned in such a manner that is presses the circular belt 13 on the run-out side of the drive branch against the drive disc 12. The pressure roll 51 consists preferably of polyamide and plunges into the rope groove of the drive disc 12. The distance between the pressure roll 51 and the drive disc 12 can preferably be adjusted, so as to be able to adjust the optimal pressure force to the circular belt 13 used. In the embodiment with pressure roll 51 or with pressure elements the sensor means could then also assigned thereto and detect their movement or standstill, so as switch the drive motor 21 on or off. For the switching on and off, a separate current interrupter switch 80 can serve in particular, to which is sent the signal of the sensor means, not shown, as a switching signal by means of the cable 81.

The climbing aid according to the invention is also switched on when a person suspends himself from the circular belt during the descent. The person thereby also experiences a weight reduction during the descent, as he has to intercept only a part of the bodyweight during each descent step. The drive motor 21 runs in the same direction during descent as during ascent, so that the drive disc 12 and the clutch disc 31 rotate in opposite direction. By the rotation of the drive disc 12, the sensor pulse is generated, and the drive motor remains switched on. With the slip clutches used, this increased wear does not pose a problem due to the opposite rotation of the clutch discs.

From the above description result a number of modifications for the expert which shall fall within the scope of the appended claims. Other mechanical slip clutches can also be used as a mechanical torque limitation. The upper guide pulley can also be implemented in an adjustable or a detachable manner for tensioning the belt. The opening angle of the guide groove can vary with the diameter of the circular belt and the material characteristics of the circular belt and the lower guide pulley. The drive can also be associated with the upper guide pulley. The sensor means can operate with contact or without contact. The sensor means can in particular detect the rotational movement of the drive disc in an optical, electrical, acoustic or magnetic manner.

The invention claimed is:

1. In combination, a ladder, a vertical ladder, or a vertical iron gangway and a climbing aid for the ladder, the vertical ladder or the vertical iron gangway, the combination comprising:

an upper guide pulley;

a lower guide pulley, wherein one of the guide pulleys is a drive disc;

an endless traction means running between the upper guide pulley and the lower guide pulley from which a person can hang by a suspension device;

a drive device including a drive motor which drives the drive disc which drives the traction means;

a drive force limitation device including a slip clutch with torque limitation interposed between the drive disc and the drive motor; and a device for switching the drive device on and off which is actuated by means of the endless traction means, wherein the device for switching the drive device on and off includes a sensor with which movement of the traction means can be detected and a pulse generation element which is directly connected to the drive disc, whereby the sensor further includes a pulse detector which senses a sensor pulse from the pulse generation element that switches the drive motor on, and an absence of detecting a subsequent sensor pulse within a time span switches the drive motor off.

2. The combination according to claim 1, wherein the pulse detector is a stationary pulse detector.

3. The combination according to claim 1, wherein the pulse generation element comprises a cam on the drive disc and wherein the pulse detector comprises a key switch.

4. The combination according to claim 1, wherein the pulse generation element comprises at least one of a cam, a groove, a bore, a magnet or a mirror at the drive disc and the pulse detector comprises at least one of a key switch, a micro switch, a sliding contact switch, a magnetic field switch, a sound detector and a photo sensor switch.

5. The combination according to claim 1, wherein a complete revolution of the drive disc activates the sensor pulse.

6. The combination according to claim 1, wherein the slip clutch comprises a first clutch disc which is mounted on a drive shaft driven by the drive motor with interposition of a free-wheel for a rotary direction, whereby the drive disc is an opposite clutch disc and is mounted on the drive shaft in a rotatable manner.

7. The combination according to claim 6, wherein a sealed chamber is formed between the first clutch disc and the opposite clutch disc, wherein the sealed chamber is filled with oil.

8. The combination according to claim 1, wherein the drive motor and the slip clutch connect to a mounting unit which is mounted in a fixed and non-tiltable manner in a housing.

9. The combination according to claim 1, wherein the traction means circulates under tension between the upper guide pulley and the drive disc, whereby a starting length of the traction means when un-tensioned is shorter than a sum of a twofold distance between pivot centers of the guide pulleys, an effective deflecting circumference at the upper guide pulley and an effective deflecting circumference at the lower guide pulley.

10. The combination according to claim 9, wherein with tension of the traction means, a starting length of the traction means is extended about 0.5-5% of a circulation length.

11. The combination according to claim 1, wherein the traction means comprises a material which is reversibly expandable or reversibly compressible.

12. The combination according to claim 1, wherein the traction means comprises a circular belt.

13. In combination, a ladder, a vertical ladder, or a vertical iron gangway and a climbing aid for the ladder, the vertical ladder or the vertical iron gangway, the combination comprising:

an upper guide pulley;

a lower guide pulley, wherein one of the guide pulleys is a drive disc;

an endless traction means running between the upper guide pulley and the lower guide pulley from which a person can hang by a suspension device;

a drive device including a drive motor which drives the drive disc which drives the traction means;

a drive force limitation device including a slip clutch with torque limitation interposed between the drive disc and the drive motor; and a device for switching the drive device on and off which is actuated by means of movement of the endless traction means, wherein the device for switching the drive device on and off includes a sensor that generates sensor pulses as a result of rotation of the drive disc, whereby the sensor further includes a pulse detector which senses each of the sensor pulses which does one of switching the drive motor on and maintaining the drive motor on, and an absence of detecting sensor pulses within a time span while the motor is on switches the drive motor off.

14. The combination according to claim 13, wherein the sensor includes a pulse generation element directly connected to the disc drive.

15. The combination according to claim 14, wherein the pulse generation element comprises a cam on the drive disc and wherein the pulse detector comprises a key switch.

16. The combination according to claim 14, wherein the pulse generation element comprises at least one of a cam, a groove, a bore, a magnet or a mirror at the drive disc and the pulse detector comprises at least one of a key switch, a micro switch, a sliding contact switch, a magnetic field switch, a sound detector or a photo sensor switch.

17. The combination according to claim 13, wherein a complete revolution of the drive disc activates one of the sensor pulses.

18. The combination according to claim 13, further comprising a roll abutting the traction means and rotating with the movement of the traction means, and wherein the sensor includes a pulse generation element directly connected to the roll.

* * * * *